United States Patent
White et al.

(10) Patent No.: US 11,089,004 B2
(45) Date of Patent: Aug. 10, 2021

(54) METHOD AND SYSTEM FOR APPLICATION AUTHENTICITY ATTESTATION

(71) Applicant: BlackBerry Limited, Waterloo (CA)

(72) Inventors: Johnathan White, St. Albans (GB); Amit Ghosh, Redmond, WA (US)

(73) Assignee: BlackBerry Limited, Waterloo (CA)

( * ) Notice: Subject to any disclaimer, the term of this patent is extended or adjusted under 35 U.S.C. 154(b) by 131 days.

(21) Appl. No.: 16/400,691

(22) Filed: May 1, 2019

(65) Prior Publication Data
US 2020/0351260 A1    Nov. 5, 2020

(51) Int. Cl.
| | |
|---|---|
| *H04L 9/00* | (2006.01) |
| *G06F 21/00* | (2013.01) |
| *H04L 29/06* | (2006.01) |
| *H04L 9/06* | (2006.01) |
| *H04L 9/08* | (2006.01) |
| *H04L 9/32* | (2006.01) |
| *G06F 21/51* | (2013.01) |
| *G06F 21/57* | (2013.01) |
| *H04W 12/06* | (2021.01) |

(52) U.S. Cl.
CPC ........ *H04L 63/0807* (2013.01); *H04L 9/0643* (2013.01); *H04L 9/0869* (2013.01); *H04L 9/3271* (2013.01)

(58) Field of Classification Search
CPC . H04L 63/0807; H04L 9/0643; H04L 9/3271; H04L 9/0869
See application file for complete search history.

(56) References Cited

U.S. PATENT DOCUMENTS

2014/0298420 A1* 10/2014 Barton .................... G06F 21/53
726/4
2017/0180314 A1* 6/2017 Walker .................... H04L 9/083

FOREIGN PATENT DOCUMENTS

WO    WO-2011101795 A1 *    8/2011    ........... H04L 9/3234

OTHER PUBLICATIONS

Thomas Polon; Sam Sander; "Attestation-Based Remote Biometric Authentication"; 2006 Biometrics Symposium: Special Session on Research at the Biometric Consortium Conference; Year: Aug. 2006; Conference Paper; Publisher: IEEE; pp. 1-5 (Year: 2006).*
BlackBerry, "BlackBerry UEM Architecture and Data Flow Reference", Version 12.10, Nov. 28, 2018.
BlackBerry, "Get Started with BlackBerry Dynamics SDK", 2019.
BlackBerry, "BlackBerry Dynamics Secure Mobility Platform", accessed online at <https://www.youtube.com/watch?v=5BaNgVkiNOk>, published Apr. 13, 2017 (screenshots of video attached).
European Patent Office, Extended European Search Report for Application No. 20159790.3, dated May 12, 2020.

* cited by examiner

*Primary Examiner* — Mohammad W Reza
*Assistant Examiner* — Courtney D Fields
(74) *Attorney, Agent, or Firm* — Moffat & Co (57) ABSTRACT

A method at a network element for attestation of applications, the method including sending a challenge to an application at an electronic device; receiving a response from the electronic device; processing the response; and upon determining that the response is invalid based on the processing, taking an enforcement action against the application.

13 Claims, 9 Drawing Sheets

METHOD AND SYSTEM FOR APPLICATION AUTHENTICITY ATTESTATION

FIELD OF THE DISCLOSURE

The present disclosure relates to application authenticity attestation, and in particular relates it to detecting and acting on applications which are spoofing or impersonating legitimate applications.

BACKGROUND

Applications may need to be secured in an enterprise environment for a number of reasons. In particular, applications may have access to data, other applications or other sensitive information within the enterprise environment, and it is therefore important to ensure that applications are behaving as expected and do not have malicious intentions.

An application may be created by an enterprise or third party, and this is the official version the application. For example, an insurance company may create an application for its adjusters to evaluate damage based on a vehicle accident or incident at a property, among other options. The application may allow for the adjuster's notes, pictures, videos, among other data to be uploaded to the enterprise's servers. Data from such application may be valuable to the insurance company since it is the basis for the claim, may be used in potential litigation in the future if the claim is disputed, among other uses.

A malicious application may wish to place a data on the servers which may contradict the data provided by a legitimate application. In other cases, the malicious application may wish to access the servers and to delete information. In other cases, the application may wish to gain access to the servers to obtain other information on the server. Other cases for malicious actions are also possible. It is therefore important to prevent such malicious applications from operating on an electronic device and accessing enterprise resources.

BRIEF DESCRIPTION OF THE DRAWINGS

The present disclosure will be better understood with reference to the drawings, in which.

DETAILED DESCRIPTION OF THE DRAWINGS

The present disclosure provides a method at a network element for attestation of applications, the method comprising: sending a challenge to an application at an electronic device; receiving a response from the electronic device; processing the response; and upon determining that the response is invalid based on the processing, taking an enforcement action against the application.

The present disclosure further provides a network element configured for attestation of applications, the network element comprising: a processor; and a communications subsystem, wherein the network element is configured to: send a challenge to an application at an electronic device; receive a response from the electronic device; process the response; and upon determining that the response is invalid based on the processing, take an enforcement action against the application.

The present disclosure further provides a computer readable medium for storing instruction code, which, when executed by a processor of a network element configured for attestation of applications cause the network element to: send a challenge to an application at an electronic device; receive a response from the electronic device; process the response; and upon determining that the response is invalid based on the processing, take an enforcement action against the application.

A mobile application may be created by a known entity, and this would be the official version of the application. Two possible attack vectors for this application would be to create a completely separate application, which spoofs or impersonates the official application; or the original application could be maliciously modified to introduce new functionality.

Both the impersonating application and the maliciously modified application may appear to be the legitimate application, and an enterprise may incorrectly grant enterprise access to such illegitimate application.

While existing protections around illegitimate applications exist on application distribution platforms, these do not necessarily perform the functionality required to protect an enterprise. Specifically, public application stores typically do not allow duplicate applications with the same identifiers. However, local creation and installation of applications at the enterprise level could lead to a threat of a "malicious insider" or "malicious insider with outside help" from attacking the enterprise.

Further, in some cases, the application may be created through an open software development kit (SDK), which may allow a malicious player to create an application that looks legitimate.

Therefore, one issue is how to ensure that an application which activates with and then communicates with the enterprise servers is actually the correct application, and not an impersonating application or a maliciously modified application.

Reference is now made to the drawings. In the drawings, like elements are shown with like numerals.

Figure 1:
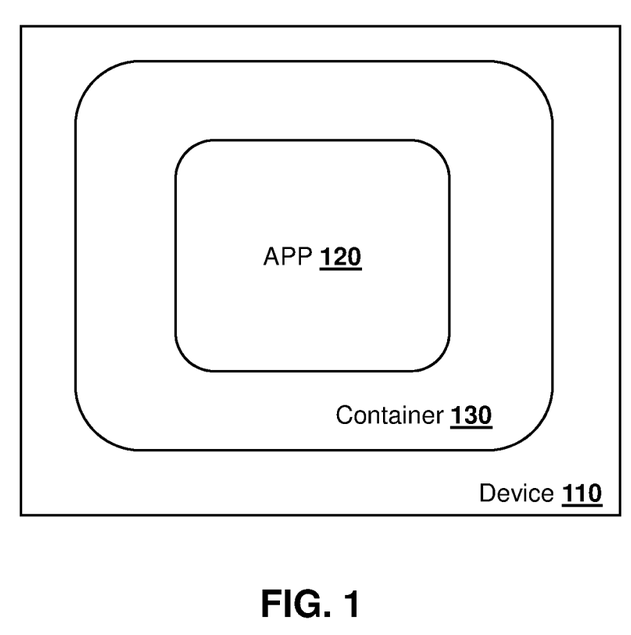
FIG. 1 is block diagram showing an application within a container on a device.

In the embodiment of FIG. 1, a device 110 may be any electronic device. Such devices include, but are not limited to, mobile devices such as smart phones, user equipments, wearables, among others. In other cases, the electronic device 110 may be a fixed or mobile device such as a laptop computer, a desktop computer, an Internet of Things endpoint, a vehicle, among other options.

Device 110 may be associated with an employee of an enterprise in some cases. For example, the enterprise may issue a smart phone to the employee. In other cases, the smart phone may belong to the employee and the employer has a bring your own device (BYOD) policy. In other cases, the device may be the user's laptop computer, or a wearable associated with that the user. In still other cases, device 110 may be an autonomous device not belonging to a particular user that has access to enterprise infrastructure.

Generally, device 110 contains software which may need access to the enterprise infrastructure. In order to access such infrastructure, device 110 may be secured by ensuring that some or all of the software on the device is legitimate software. For example, in some cases, software that may access the enterprise infrastructure may be run in a secure or trusted environment. In other cases, the enterprise may manage the type of applications that are allowed to be installed on device 110. Other policies for securing device 110 are also possible.

The securing of the device may be done in conjunction with a unified endpoint management system in some cases, as detailed with regard to FIG. 3 below.

An application 120 is one of the applications that the enterprise seeks to secure. In particular, the enterprise may wish to ensure that application 120 has access to enterprise services or infrastructure and in this regard wants to ensure that application 120 is the legitimate application. In order to do this, in some cases, the application 120 may be placed within a virtual container 130 which provides various functionality for the application.

In particular, container 130 may provide for encrypted communications between the application 120 and a server. Container 130 may further provide functionality to secure the application, including authentication, lifecycle management, security and compliance policies, secure connectivity to enterprise services, secure storage, secure inter-application communication, application configuration and application-specific policy management, among other such functionality. In accordance with some embodiments of the present disclosure, the container may provide the functionality to respond to attestation challenges provided by an infrastructure element.

Figure 2:
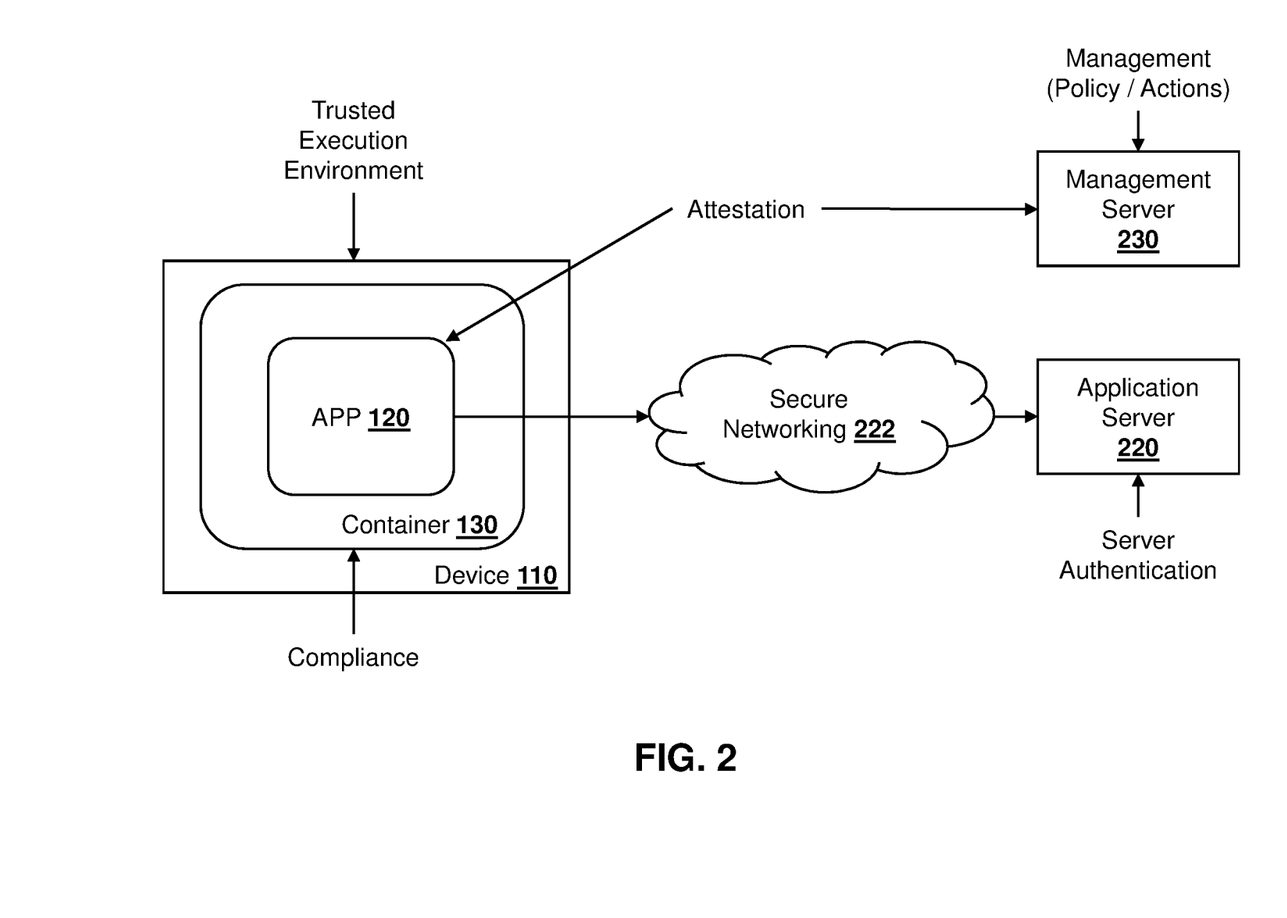
FIG. 2 is a block diagram showing an example architecture for the attestation of an application on a device with a management server.

Device 110 may then operate in an environment which allows for the functionality of container 130 to be implemented. Reference is now made to FIG. 2. In the embodiment of FIG. 2, application 120 may be loaded and updated from an application server 220 over a secure networking connection 222.

Further, in the environment of FIG. 2, a management server 230 may control policies and actions for the various applications deployed on devices 110. One example of such function for the management server 230 is the attestation of applications on a device 120. Such attestation is described with regard to FIGS. 4 to 7 below.

Figure 3:
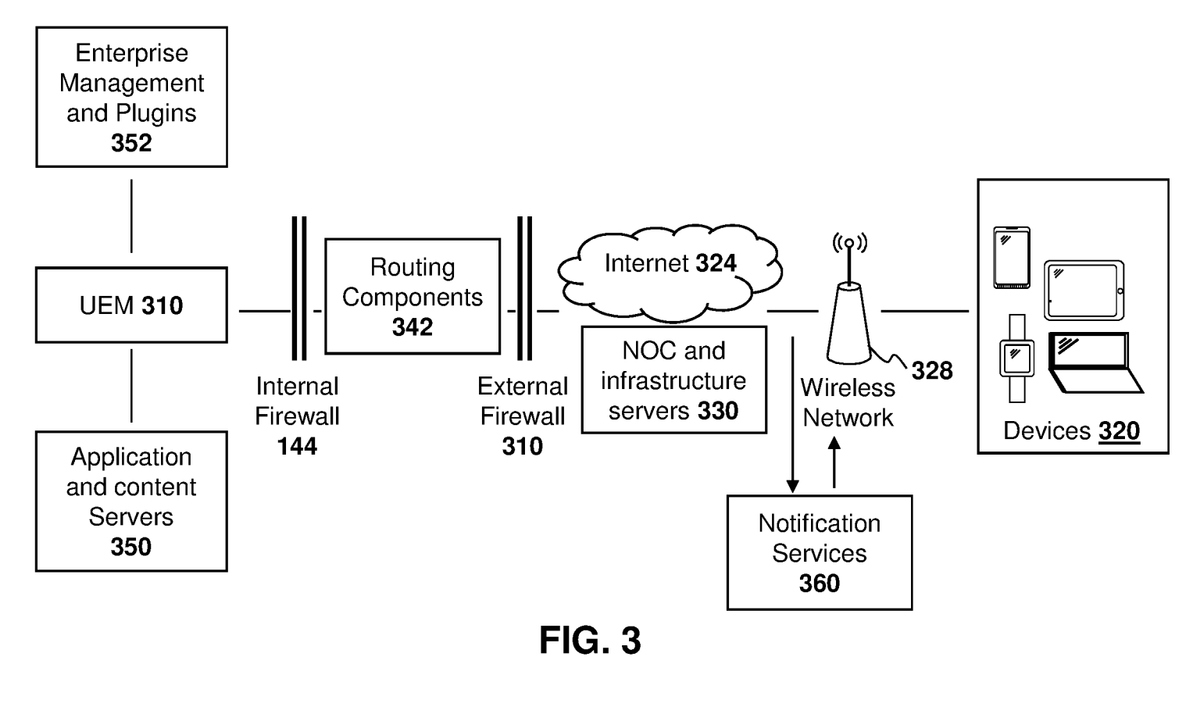
FIG. 3 is a block diagram showing an example architecture for Unified Endpoint Management.

In some cases, management server 230 may be a unified endpoint management server and one example architecture for such system is provided with regard to FIG. 3.

UEM

Unified Endpoint Management (UEM) is a software tool that allows for device or application management. UEM is an evolution of Mobile Device Management (MDM) and Enterprise Mobility Management (EMM) and allows for the management of various electronic device endpoints, including mobile devices, user equipments, laptops, desktop computers, smart phones, tablets, wearables, laptops, printers, Internet of things devices, among others.

A UEM platform may provide for information technology departments of enterprises to be capable of managing endpoints, including managing the software installed on endpoints and to provide for security for communication between endpoints and other elements or servers within the enterprise system.

One example of a UEM platform architecture is shown with regard to FIG. 3. However, the embodiment of FIG. 3 is merely provided for illustration purposes, and in other cases, different endpoint management solutions are possible.

In the embodiment of FIG. 3, a UEM 310 forms part of an enterprise network. UEM 310 provides multiplatform device, application, and content management with integrated security and connectivity.

In particular, the endpoints in the embodiment of FIG. 3 are shown as devices 320. Devices 320 can be any endpoint device or application, as indicated above. The endpoint devices can run varied operating systems. For example, in some cases the devices may run one or more of Android™, iOS™, MacOS™ Windows™, BlackBerry™ OS, UNIX, Linux™, among other options.

Devices 320 may connect with Internet 324 through any wired or wireless network. In the example of FIG. 3, a wireless network 328 is shown.

One or more servers connected to the Internet 324 may be the network operations Center (NOC) and Infrastructure Servers 330 associated with the UEM. The NOC and Infrastructure Servers 330 provide for secure communications between specific applications on devices 320 and UEM 310. The NOC and Infrastructure Servers 330 further contain infrastructure components to register user information for device activation, to validate licensing information for the UEM 310, and to provide a trusted path between the organization and users based on strong, cryptographic, and mutual authentication. In this regard, the NOC and Infrastructure Servers 330 maintain a constant connection to the UEM 310, meaning that an enterprise may only need a single outbound connection to a trusted IP address to send data to users. Data that travels between the NOC and Infrastructure Servers 330 and the UEM 310 is authenticated and encrypted to provide a secure communications channel into the enterprise for devices outside the enterprise firewall.

An enterprise will typically include an external firewall 340 to filter traffic both into and out of the enterprise.

Further, in some embodiments, optional routing components 342 and an optional internal firewall 344 may exist. The routing components 342 may be used to allow connections from internal enterprise components to the Internet if an enterprise restricts such use. In this regard, the routing components 342 may act as a proxy server for connections between the UEM 310 and devices 320.

In addition, UEM 310 may interact with other servers within the enterprise network. These may include, for example, application and content servers 350, which may, for example, provide functionality for a company directory, mail servers, certificate authorities, among other functionality.

Further, UEM 310 may interact with Enterprise Management and Plugins Server 352. Such Enterprise Management and Plugins Server 352 allows the extension of the UEM capabilities within an organization or enterprise.

In the embodiment of FIG. 3, notification services 360 allow for the sending of notifications to devices 320 to contact the UEM 310 for updates and to report information. In operation, such notifications are sent to the NOC and infrastructure servers 330 where they may then be sent to devices using the appropriate notification services. For example, Apple™ uses a service entitled "Apple Push Notification Service (APNS)" to send notifications to iOS and Mac OS devices. Google™ uses a service entitled "Firebase Cloud Messaging (FCM)" to send notifications to Android devices. Microsoft™ uses a service entitled "Windows Push Notification Services (WNS)" to send notifications to Windows™ devices. Other notification services could equally be used with the present disclosure.

Application Attestation

In the present disclosure, one issue addressed is how to ensure that an application which activates with and then communicates with an enterprise, for example through a UEM, is actually the correct application and not an impersonating or spoofing application or a modified application.

Each application in system may have a unique identifier. The unique identifier may comprise various information, for example based on certificates, device identifiers, among other such information. Further, in some cases, the identifier may be a combination of a plurality of identifiers. For example, in some cases, the identifier comprises a native bundle identifier, and an access entitlement identifier.

Figure 4:
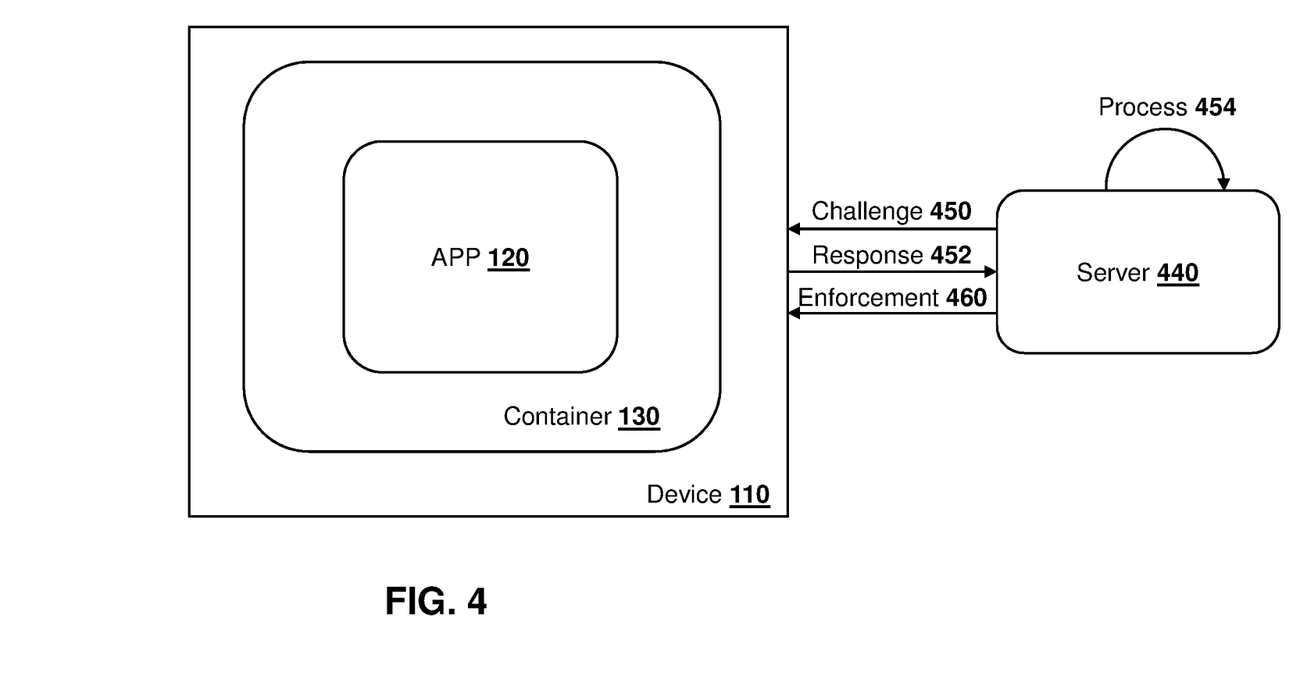
FIG. 4 is a block diagram showing a device and server in which a process for challenging and application and enforcing a policy is shown.

In this regard, referring to FIG. 4, a server 440 may issue a challenge 450 to an application 120 on device 110. Based on the challenge 450, the application and/or container 130 will generate a response 452.

Server 440 may then process the response, as shown with arrow 454. If server 440 determines that the response is a failure, then an enforcement action, shown with arrow 460, may be taken.

Each of these actions is described in more detail below.

In particular, server 440 exercises attestation under a policy control regime when an attestation feature is enabled in a server such as a UEM server. When such attestation feature is enabled, the server 440 will enforce attestation during the activation of any application against the server. Only if attestation passes at activation time is the application granted access to server 440 and thus to the enterprise. This ensures security as only applications which are considered valid or allowed to be used. Attestation during installation is described below with regards to FIG. 5.

After activation, periodic attestation of these applications is possible to ensure that they remain valid. This periodic attestation takes place at an IT admin configurable period, known as a challenge frequency. The challenge frequency is a configurable parameter in some embodiments. Attestation after installation is described below with regards to FIG. 6.

In a further scenario, a server such as a UEM server exposes Representational State Transfer (REST) Application Program Interfaces (APIs), and these can be used to trigger attestation, and query a last attestation result. These allow other server components to access an attestation result, the time the result was obtained, and then decide if the time elapsed since the last attestation time is more than a security threat model for the enterprise. If yes, the server can use the REST API to issue a new attestation challenge as required.

Based on this model, another server in the enterprise can use the UEM REST APIs to ensure before it accepts data from a mobile application it has checked that attestation has completed in the past X minutes, where X may be a configurable value. This is described with regards to FIG. 7.

Further, a separate IT admin control may be provided, known as the grace period. This is the length of time that the server will wait without receiving a response before taking action. Various types of grace periods may be possible. For example, in one case a device grace period may be used to see whether any application on the device responds within a time period. In other cases, an application grace period will expire if the individual and specific application has not replied during the time period. In some cases, only one grace period is used. In other cases, for example if multiple applications are being managed on an electronic device, multiple grace periods may be used.

The use of a grace period is to avoid a situation where an application is purposely kept off-line or purposely not responding to an attestation request because the application knows such a response would fail. The grace period is described below with regards to FIG. 8.

In the embodiments of FIGS. 4 to 8, for an attestation of an application to be successful, the server processing the response needs to be able to know information about the actual official application, from a trusted source, to be able to accurately determine if a specific attestation response can be trusted or not. This "source of truth" may be the infrastructure components, as for example provided in FIG. 3. The infrastructure servers 330 of FIG. 3 may be global and each UEM may in some cases securely connect and interact with such servers. This source of truth provides a path to send and receive information about applications that can be used for attestation.

Various options for this path are possible. A first option relates to application policy files which are sent and automatically updated to each UEM and can contain information about the application.

A second option relates to a core proxy Universal Resource Locator (URL) for querying specific identifiers of an application.

A third option involves the core proxy URL paths for requesting an attestation check from a remote party where the UEM does not have the credentials or the source of truth and these are transparently added by infrastructure to avoid being sent to each UEM.

The method of achieving attestation may involve utilizing the different mechanisms of attestation integrated into a framework provided by an operating system to allow the best use of the functionality available on the platform.

Figure 5:
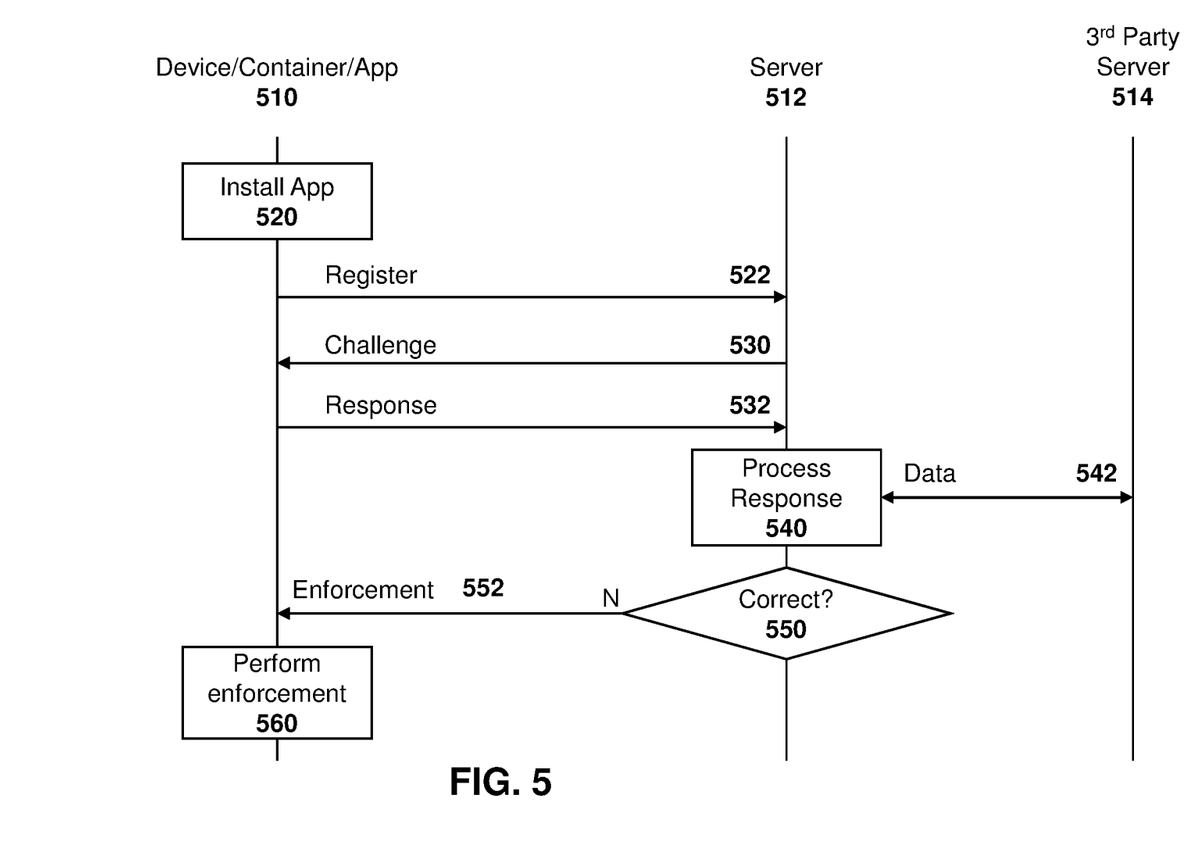
FIG. 5 is a dataflow diagram showing a process for attestation of an application on a device at the time of installation.

Based on the above, reference is now made to FIG. 5. In the embodiment of FIG. 5, a device having an application which may, optionally, be in a container, is referred to as the device/container/app 510. Such device communicates with a server 512. Further, in some cases, a third-party server 514 may be used for attestation, as described below.

The embodiment of FIG. 5 describes attestation during setup or activation of an application and in this regard, as shown by block 520, the application is installed. Setup or activation of the application may require a registration, shown with message 522, with server 512.

Based on the registration message 522, server 512 may issue a challenge 530, which in some cases may include a nonce.

In response to the receipt of challenge 530, the device/container/app 510 may send a response 532 which may contain the nonce from challenge 530 hashed with various identifiers stored at the device/container/app 510.

Server 512 may then process that response, as shown at block 540, to determine whether the attestation was successful or not. The processing of the response at block 540 may include exchanging data, shown with arrow 542, with third party server 514. Third party server 514 may be a trusted server known to server 512 which may contain data such as identifiers for a device, container or application.

Attestation may be based on different elements within the device/container/app 510, including application identifiers, device characteristics or identifiers, hardware characteristics or identifiers, or based on a specific operation.

For example, in the iOS platform, a two-stage verification may be undertaken. In particular, the server may send challenge 530 which includes a nonce. The iOS application then hashes the nonce with a dynamic application entitlement identifier, which is a unique identifier for the application within the enterprise infrastructure. The nonce is further hashed with the iOS Team ID which is obtained from the iOS operating system. The nonce is further hashed with an Apple Device Check (ADC) token. This hash, along with the ADC token in the clear, is sent back to the server 512 in response 532.

In other cases, an HMAC_SHA512 may be the algorithm used. In this case, the TeamID and entitlement ID are combined together and used as the hashed message authentication code (HMAC) key. A nonce and Device Check Token are combined together and used as the HMAC message (for example this may be done instead of a straight SHA hash of all 4 combined as it is harder to have a collision or issue with HMAC).

Other options for hashing are also possible.

The server 512 may then process the response, as shown at block 540, by recomputing the hash, based on the entitlement ID and the iOS Team ID that has been returned from the infrastructure components as the source of truth to ensure that they match. If they do not match, then the application has been compromised.

If they do match, the server 540 may, as a second level of check, submit a device check token via a core proxy where the infrastructure components at authentication information to the Device Check Token which may then be checked against the ADC server (e.g. $3^{rd}$ party server 514) for a second level of verification. This second level of verification involves network routing, which is secured and private. Typically, such routing does not require a direct outbound connection from UEM Server to a Third Party Server, as it goes through a core proxy infrastructure to handle the routing, thus benefiting customers that do not need to open firewall for such connections. Further, routing through a proxy allows transparent addition of private information/credentials to the request to be able to correctly authenticate it at the $3^{rd}$ party server. In this way, the credentials do not need to be provided to each UEM Server, but instead the credentials can be stored at the proxy and be kept secret.

Similarly, for an Android application, a challenge with a nonce may be sent as challenge 530. The device/container/app 510 may then provide a signed response 532. The response can be checked at block 540 to see if the signatures of the response came from a Google root key. In particular, server 512 has information about the signing key signs of the application. If the signing key matches the information already stored in the infrastructure then the application is deemed to be good and is the official application.

Similar actions may be taken with other operating systems and applications.

As a result of the processing of the response at block 540, it may be determined, at block 550, that the response is not correct. If so, then an enforcement action, shown with arrow 552, may be taken. The device/container/app 510 may then perform the enforcement action, as shown at block 560. For example, the enforcement action may be to wipe the application from the device. In other cases, the enforcement action may be a prompt to a user indicating that the application is compromised. In other cases, the enforcement action may be performed at the server 512 by restricting access from the application. In other cases, the enforcement action may be to block the running of the application on the device. Other options for enforcement are possible.

Figure 6:
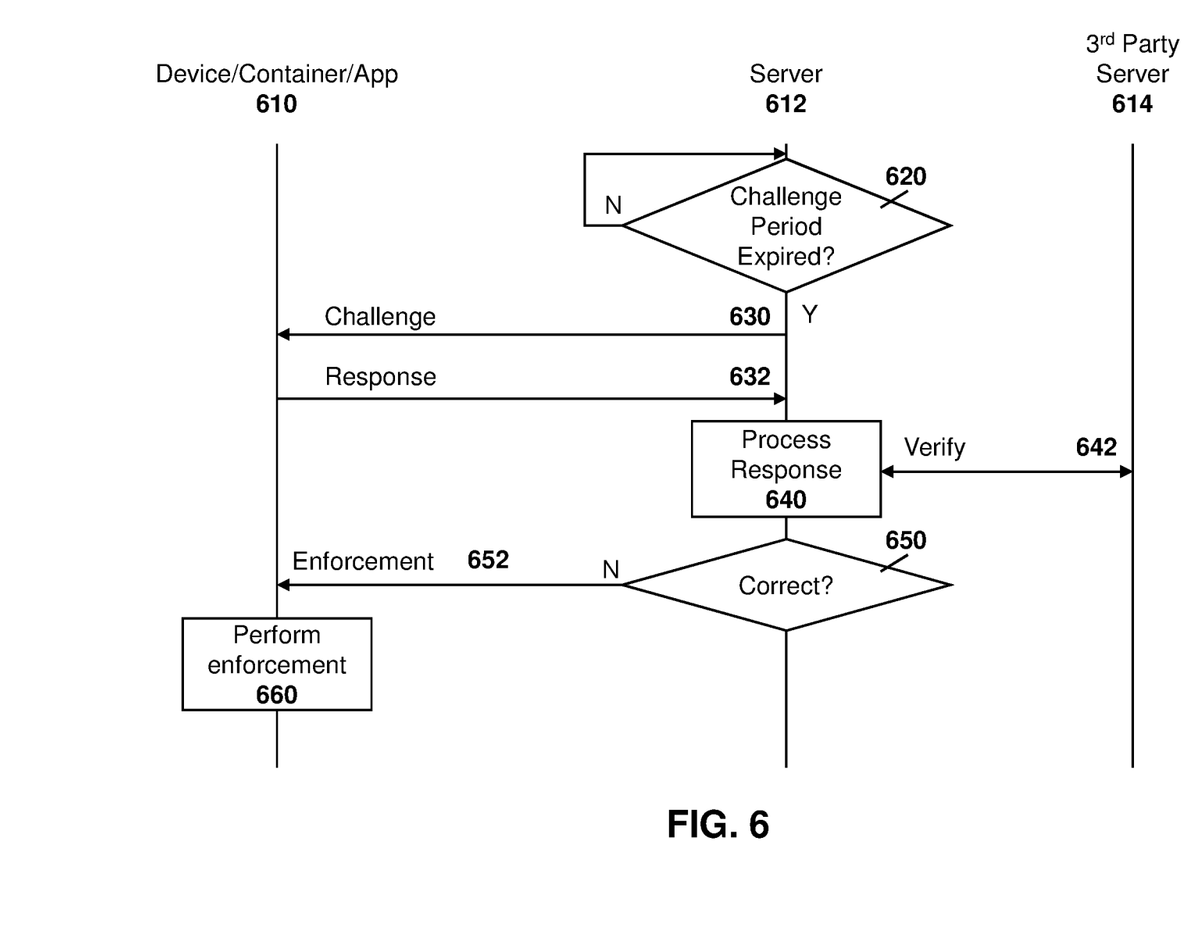
FIG. 6 is a dataflow diagram showing a process for attestation of an application on a device post installation.

Once the application is activated, it may be periodically checked based on a challenge period. Such challenge period may be configurable. For example, reference is now made to FIG. 6. In the embodiment of FIG. 6, a device/container/app 610 includes the application that was installed and verified in FIG. 5. The server 612 may want to ensure that the application has not been compromised and therefore may periodically send challenges. Further, a third-party server 614 may provide data to the server 612 as described above with regard to third-party server 514.

Server 612 may check whether a challenge period has expired at block 620. If not, the process may continue to loop at block 620 until the challenge period expires.

Once the challenge period expires, the process proceeds to send a challenge 630 to the device/container/app 610. As indicated above with regard to challenge 530, the challenge 630 may include a nonce which the device/container/app 610 may then hash with identifiers on the device/container/app. A response 632 is then provided back to server 612.

The server 612 may then process the response, as shown at block 640. Such processing may be similar to the processing performed at block 540 described above. The processing may further include verification of data or an exchange of data with the third-party server 614, shown with arrow 642.

A check may then be made at block 650 to determine whether the response is correct and, if not, then an enforcement action, shown with arrow 652, may be performed. The enforcement action may include the device/container/app 610 performing the enforcement action as shown at block 660.

Therefore, in the embodiment of FIG. 6, even after an application has been installed, it may periodically be challenged to ensure that the application has not been substituted with a spoofing or impersonating application, or with an application that has been modified.

Figure 7:
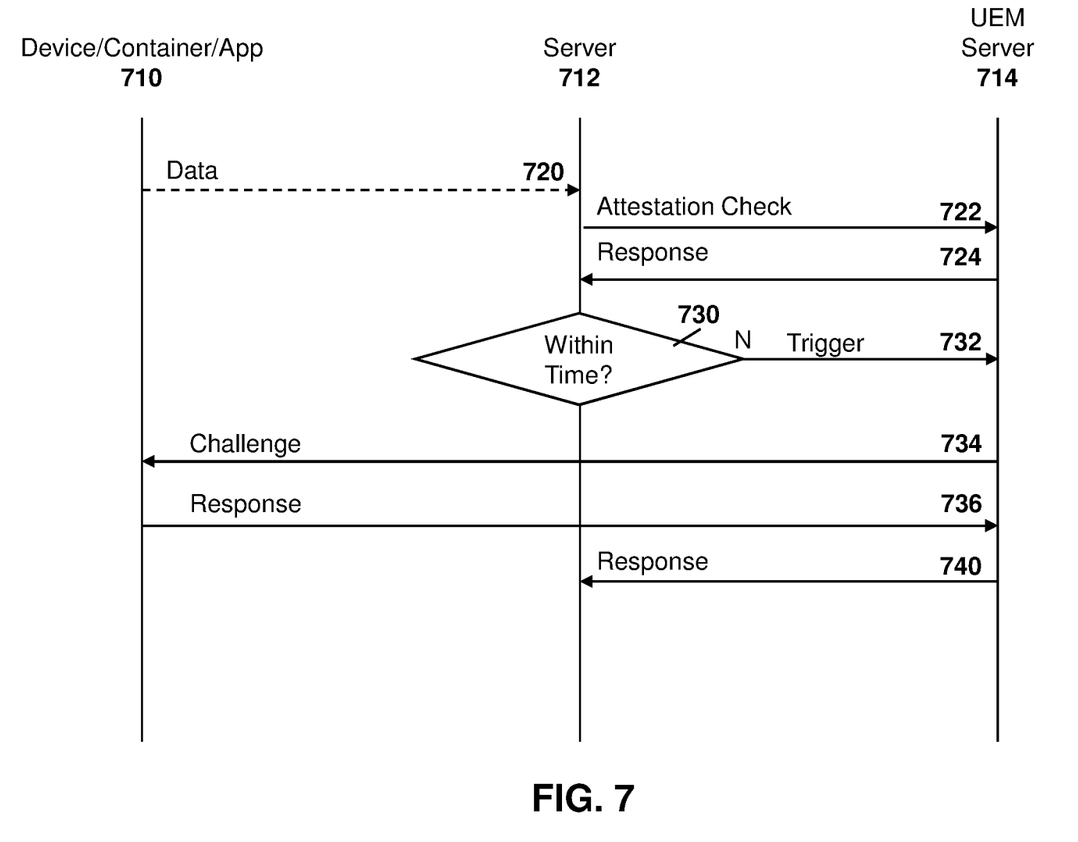
FIG. 7 is a dataflow diagram showing a process for querying another server with regard to the attestation status of a device/container/app.

In a further embodiment, another server within the enterprise network may query attestation results, for example to a UEM server. Thus, reference is now made to FIG. 7. In the embodiment of FIG. 7, a device/container/app 710 communicates with a server 712. The communications between the device/container/app 710 and server 712 may be direct or may be through another server such as a UEM server 714.

In the embodiment of FIG. 7, server 712 needs to communicate with the device/container/app 710. This may be because data has been received, for example shown with dotted line 720. However, other reasons for such interaction are also possible.

In order to allow for access to resources, server 712 may need to know whether or not attestation for the device/container/app has occurred recently. In this regard, UEM server 714 may expose APIs to allow for checking on the attestation status of the device/container/app.

Utilizing such APIs, the server 712 sends an attestation check message 722 to the UEM server 714. The UEM server may then send a response message 724 back to the server 712. The response message 724 may indicate that attestation has occurred and the last time that such attestation has occurred.

Server 712 may then perform a check, as shown at block 730. The check may determine whether the attestation of the device/container/app 710 has occurred within a configured or preset time period. For example, attestation may need to occur with every five minutes in order to allow for access to data at the enterprise. Therefore, the check at block 730 would determine whether or not attestation has occurred within the last five minutes. However, as will be appreciated by those in the art, five minutes is merely provided as an example and other options for the time period within which attestation must have occurred are possible.

If the check at block 730 finds that attestation has not occurred within the predetermined time limit, then the server 712 may use APIs at server 714 to send a trigger to perform an attestation, as shown with message 732.

In response to receiving message 732, the server 714 may send a challenge, shown with message 734 to the device/container/app 710. A response, shown as message 736, may then be provided back to the server 714. A check such as check 550 or 650 from FIGS. 5 and 6 above may then be performed (not shown) and if such check fails then enforcement action may be taken.

If the check passes, in some embodiments the results of the attestation response may then be forwarded to the server 712, shown with response 740.

Therefore, the above allows for the attestation to occur with a single server and other service to have ways of querying whether attestation is occurred within a set time limit.

Figure 8:
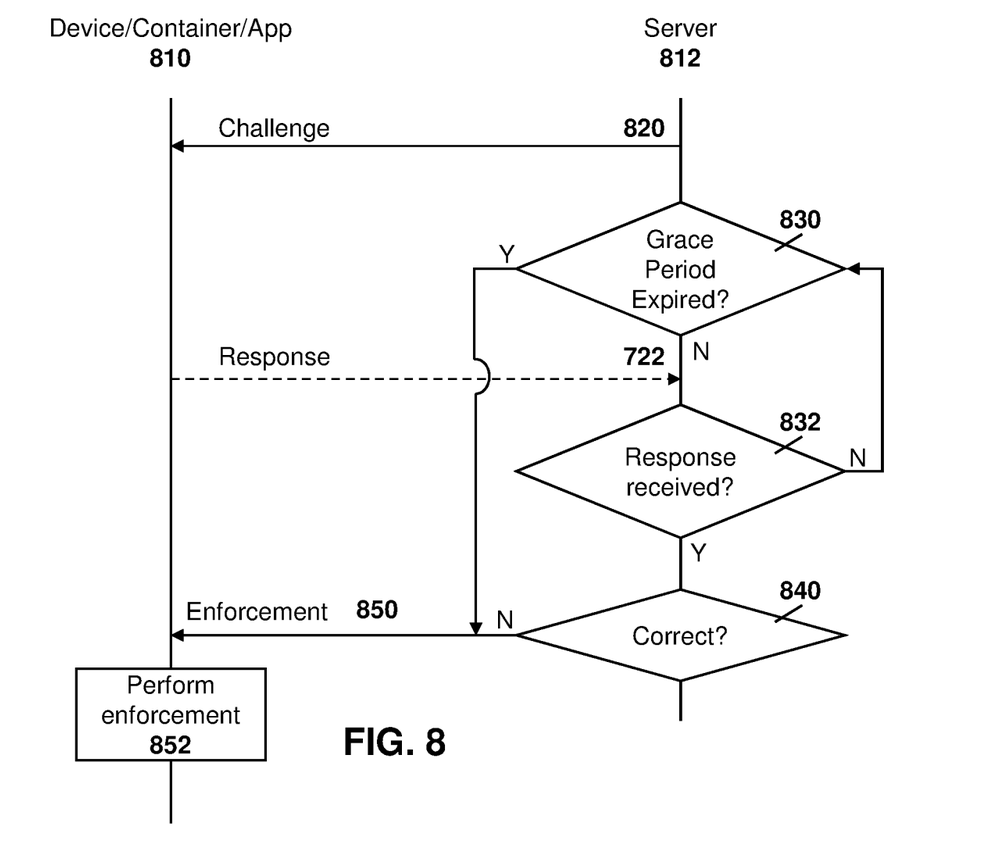
FIG. 8 is a dataflow diagram showing the implementation of a grace period within which to receive a response to a challenge request.

In some cases, responses 532, 632 and/or 736 may not be received back at servers 512, 612 and or 714 respectively. In particular, the modified or spoofing application may block a challenge response to avoid detection. In this regard, one or more "grace periods" may be provided at the server within which a response is to be received. The grace period(s) may be long enough to ensure that if a device is out of communication or turned off that the application will not be adversely affected, yet still allow the enforcement action to be taken if the application ultimately does not respond. Reference is now made to FIG. 8.

In the embodiment of FIG. 8, the device/container/app 810 may communicate with a server 812. In this regard, server 812 may issue a challenge 820 to the device/container/app 810.

At this point, a timer may be started to track each grace period, which may be configurable through policy such as through the IT department of an enterprise. As indicated above, various grace periods such as application and device grace periods may exist.

The process proceeds to block 830 in which a check is made to determine whether the grace period has expired. If not, the process proceeds to block 832 in which a check is made to determine whether a response to the challenge 820 is received. Such response is shown in dotted lines as response 822 in the embodiment of FIG. 8. However, in some cases response 822 may never be received.

If no response is received and the grace period has not expired, the process will continue to loop between blocks 830 and 832.

If a response is received, the process proceeds from block 832 to block 840 in which a check is made to determine whether the response is correct. Such check may involve processing similar to that of blocks 540 and 640 from FIGS. 5 and 6 above. If the response is not correct, the process may perform an enforcement action, as shown by arrow 850 and an enforcement action may be taken at the device/container/app 810, shown with block 852.

Further, if the grace period expires at block 830, the process may proceed directly to performing the enforcement action of arrow 850. In this way, the server 812 is not waiting indefinitely for a response to a challenge 820.

In some cases, while waiting for a response to challenge 820, the device/container/application 810 may interact with server 812 for a different purpose. In this case, the process may interrupt to the loop between blocks 830 and 832 and proceed directly to an enforcement action, since the device is clearly communicating with the server and therefore must be blocking the response to the challenge 820.

Other examples for implementing a grace period are also possible.

Based on the above, the use of the policy control, enforcement, the source of truth, and the method for achieving attestation allow for a check to be made to determine whether an application is that the legitimate application, or whether the application is a spoof, impersonating an original application, or is an application that has been modified to introduce new functionality.

The devices and servers and network elements described above may be any computing device or network node. Such computing device or network node may include any type of electronic device, including but not limited to, mobile devices such as smartphones or cellular telephones. Examples can further include fixed or mobile user equipment, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, engine control units (ECUs), among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 9:
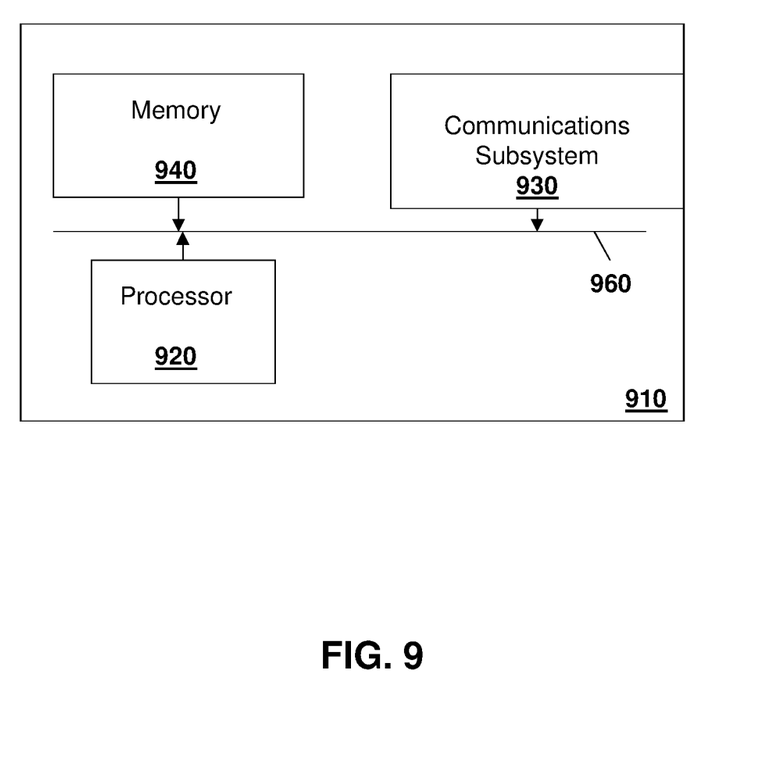
FIG. 9 is a block diagram of a simplified network element capable of being used with the embodiments of the present disclosure.

One simplified diagram of a computing device is shown with regard to FIG. 9. The computing device of FIG. 9 could be any mobile device, portable device, network node, server, or other node as described above.

In FIG. 9, device 910 includes a processor 920 and a communications subsystem 930, where the processor 920 and communications subsystem 930 cooperate to perform the methods of the embodiments described above. Communications subsystem 920 may, in some embodiments, comprise multiple subsystems, for example for different radio technologies.

Processor 920 is configured to execute programmable logic, which may be stored, along with data, on device 910, and shown in the example of FIG. 9 as memory 940. Memory 940 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 940, device 910 may access data or programmable logic from an external storage medium, for example through communications subsystem 930.

Communications subsystem 930 allows device 910 to communicate with other devices or network elements and may vary based on the type of communication being performed. Further, communications subsystem 930 may comprise a plurality of communications technologies, including any wired or wireless communications technology.

Communications between the various elements of device 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network element for attestation of applications, the method comprising:
sending a challenge to an application at an electronic device, the challenge including a nonce;
setting a grace period for receiving a response;
when the grace period expires before the response is received, taking an enforcement action against the application;
receiving the response from the electronic device, the response including a hash of the nonce with a plurality of identifiers stored at the electronic device;
obtaining the plurality of identifiers from a trusted network server to recompute the hash;
comparing the hash in the response with the recomputed hash; and
upon determining that the response is invalid based on the comparing, taking the enforcement action against the application.

2. The method of claim 1, wherein the plurality of identifiers includes a team identifier stored in an operating system of the electronic device and obtainable from the network server.

3. The method of claim 2, wherein the processing further comprises:
receiving, in the response, a device check token;
adding authentication information to the device check token;
sending the device check token with the added authentication information to a device check server; and
receiving a response from the device check server to indicate whether the device check token is valid.

4. The method of claim 1, wherein the enforcement action comprises at least one of: reporting the failure; blocking the application from accessing network resources; instructing the electronic device to wipe the application; instructing the electronic device to prompt a user to perform an action on the application; and instruct the electronic device to block running of the application.

5. The method of claim 1, wherein the sending the challenge is performed on activation of the application.

6. The method of claim 1, wherein the sending the challenge is performed at a configurable challenge frequency.

7. A network element configured for attestation of applications, the network element comprising:
- a processor; and
- a communications subsystem, wherein the network element is configured to:
- send a challenge to an application at an electronic device, the challenge including a nonce;
- set a grace period for receiving a response;
- when the grace period expires before the response is received, take an enforcement action against the application;
- receive the response from the electronic device, the response including a hash of the nonce with a plurality of identifiers stored at the electronic device;
- obtain the plurality of identifiers from a trusted network server to recompute the hash;
- compare the hash in the response with the recomputed hash; and
- upon determining that the response is invalid based on the comparing, take the enforcement action against the application.

8. The network element of claim 7, wherein the plurality of identifiers includes a team identifier stored in an operating system of the electronic device and obtainable from the network server.

9. The network element of claim 8, wherein the network element is further configured to process by:
- receiving, in the response, a device check token;
- adding authentication information to the device check token;
- sending the device check token with the added authentication information to a device check server; and
- receiving a response from the device check server to indicate whether the device check token is valid.

10. The network element of claim 7, wherein the enforcement action comprises at least one of: reporting the failure; blocking the application from accessing network resources; instructing the electronic device to wipe the application; instructing the electronic device to prompt a user to perform an action on the application; and instruct the electronic device to block running of the application.

11. The network element of claim 7, wherein the network element is configured to send the challenge on activation of the application.

12. The network element of claim 7, wherein the network element if configured to send the challenge at a configurable challenge frequency.

13. A non-transitory computer readable medium for storing instruction code, which, when executed by a processor of a network element configured for attestation of applications cause the network element to:
- send a challenge to an application at an electronic device, the challenge including a nonce;
- set a grace period for receiving a response;
- when the grace period expires before the response is received, take an enforcement action against the application;
- receive the response from the electronic device, the response including a hash of the nonce with a plurality of identifiers stored at the electronic device;
- obtain the plurality of identifiers from a trusted network server to recompute the hash;
- compare the hash in the response with the recomputed hash; and
- upon determining that the response is invalid based on the comparing, take the enforcement action against the application.

* * * * *